United States Patent
Ebe et al.

(10) Patent No.: US 10,859,469 B2
(45) Date of Patent: Dec. 8, 2020

(54) TIRE DEFORMATION CALCULATOR, OVERLOAD DETECTING SYSTEM, AND METHOD FOR CALCULATING TIRE DEFORMATION

(71) Applicant: KONICA MINOLTA, INC., Tokyo (JP)

(72) Inventors: Asahi Ebe, Hachioji (JP); Takashi Yamada, Hino (JP); Toru Kikuchi, Tokyo (JP)

(73) Assignee: KONICA MINOLTA, INC., Tokyo (JP)

( * ) Notice: Subject to any disclaimer, the term of this patent is extended or adjusted under 35 U.S.C. 154(b) by 64 days.

(21) Appl. No.: 16/168,128

(22) Filed: Oct. 23, 2018

(65) Prior Publication Data

US 2019/0120723 A1 Apr. 25, 2019

(30) Foreign Application Priority Data

Oct. 24, 2017 (JP) ................................ 2017-205045

(51) Int. Cl.
*G06T 7/20* (2017.01)
*G01M 17/02* (2006.01)
(Continued)

(52) U.S. Cl.
CPC ........... *G01M 17/027* (2013.01); *B60C 23/06* (2013.01); *B60C 23/064* (2013.01); *G01B 11/16* (2013.01);
(Continued)

(58) Field of Classification Search
CPC .......... G01N 33/227; G01H 9/00; G01H 1/00; G06K 9/00771; G06T 7/62;
(Continued)

(56) References Cited

U.S. PATENT DOCUMENTS 7,230,694 B2 6/2007 Forster et al.
8,254,666 B2 8/2012 Uffenkamp et al.
(Continued)

FOREIGN PATENT DOCUMENTS

CN 105172494 A 12/2015
DE 29716210 U1 1/1998
(Continued)

OTHER PUBLICATIONS

Extended European Search Report (EESR) dated Dec. 10, 2018 issued in counterpart European Application No. 18199503.6.
(Continued)

*Primary Examiner* — Phuoc H Doan
(74) *Attorney, Agent, or Firm* — Holtz, Holtz & Volek PC

(57) ABSTRACT

A tire deformation calculator includes a processor. The processor (i) detects a contour of a side face of a tire attached to a wheel of a vehicle in a captured image; (ii) calculates load deformation of the contour of the side face, the load corresponding to a weight of the vehicle; (iii) identifies a circular or polygonal shape or pattern on a plane parallel to the contour of the side face; (iv) determines a conversion value for converting the identified shape or pattern in the captured image to a perfect circle or a regular polygon; (v) calculates a predetermined value indicating the load deformation of the tire in the captured image based on the conversion value; and (vi) calculates the load deformation based on the predetermined value.

19 Claims, 7 Drawing Sheets

(51) Int. Cl.
  *G06T 7/62* (2017.01)
  *G01B 11/16* (2006.01)
  *B60C 23/06* (2006.01)
(52) U.S. Cl.
  CPC ...... *G06T 7/62* (2017.01); *G06T 2207/30248* (2013.01)
(58) Field of Classification Search
  CPC ............. G06T 2207/30248; G06T 7/13; G06T 11/105; G06T 7/0004; G01M 17/027
  USPC .......................... 382/104, 296, 100, 141, 103
  See application file for complete search history.

(56) References Cited

U.S. PATENT DOCUMENTS

| | | | |
|---|---|---|---|
| 10,475,201 B1* | 11/2019 | Hall | ........................... G06T 7/62 |
| 2005/0030525 A1 | 2/2005 | Forster et al. | |
| 2008/0319706 A1* | 12/2008 | Uffenkamp | .......... G01B 11/275 |
| | | | 702/150 |
| 2015/0143913 A1* | 5/2015 | Adams | ................. G01N 33/227 |
| | | | 73/655 |

FOREIGN PATENT DOCUMENTS

| | | |
|---|---|---|
| DE | 102005017624 A1 | 10/2006 |
| EP | 1505367 A2 | 2/2005 |
| JP | H10272907 A | 10/1998 |

OTHER PUBLICATIONS

Chinese Office Action (and English language translation thereof) dated Apr. 16, 2020 issued in Chinese Application No. 201811220389.5.

Chinese Office Action (and English language translation thereof) dated Sep. 21, 2020 issued in Chinese Application No. 201811220389.5.

* cited by examiner

TIRE DEFORMATION CALCULATOR, OVERLOAD DETECTING SYSTEM, AND METHOD FOR CALCULATING TIRE DEFORMATION

BACKGROUND

1. Technological Field

The present invention relates to a tire deformation calculator, an overload detecting system, and a method for calculating tire deformation.

2. Description of the Related Art

Systems have long been known to detect overload of cargo vehicles such as trucks. Running of overloaded vehicles carrying loads heavier than predetermined loading weights is undesirable for safety and the maintenance of roads and thus is monitored at various observation points.

A known monitoring system actually measures the weight of vehicles with a weight scale embedded in a road. However, such a monitoring system requires the vehicles to temporarily stop. This precludes the flow of traffic and thus is troublesome. Furthermore, during the maintenance of the weight scale, which is installed on a trafficked road, the road should be closed. In contrast, JP H10-272907A discloses a technique of detecting overload through image capturing of a tire of a running vehicle and calculating the deformation of the tire.

However, all running vehicles do not always pass over the same position on the road. This causes a variation in the image capturing conditions depending on the positional relationship between the imaging device and the position or direction of the running vehicle. Thus, the traditional technology cannot appropriately estimate the deformation of tires caused by overload for every vehicle and thus is not suitable for practical use.

SUMMARY

An object of the present invention is to provide a tire deformation calculator, an overload detecting system, and a method for calculating tire deformation that can detect deformation of a tire of a vehicle due to overload and can be put to practical use.

To achieve at least one of the abovementioned objects, according to an aspect of the present invention, a tire deformation calculator includes:

a processor which
(i) detects a contour of a side face of a tire attached to a wheel of a vehicle in a captured image;
(ii) calculates load deformation of the contour of the side face, the load corresponding to a weight of the vehicle;
(iii) identifies a circular or polygonal shape or pattern on a plane parallel to the contour of the side face;
(iv) determines a conversion value for converting the identified shape or pattern in the captured image to a perfect circle or a regular polygon;
(v) calculates a predetermined value indicating the load deformation of the tire in the captured image based on the conversion value; and
(vi) calculates the load deformation based on the predetermined value.

According to another aspect of the present invention, a method for calculating load deformation of a tire corresponding to a weight of a vehicle in a captured image is provided. The method includes:

a detecting step of detecting a contour of a side face of a tire attached to a wheel of a vehicle in a captured image;
an identifying step of identifying a circular or polygonal shape or pattern in a plane parallel to the contour of the side face;
a conversion value acquiring step of determining a conversion value for converting the shape or pattern in the captured image to a perfect circle or a regular polygon; and
a calculating step of calculating a predetermined value indicating the load deformation of the tire in the captured image based on the conversion value determined in the conversion value acquiring step and calculating the load deformation based on the predetermined value.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF EMBODIMENTS

Hereinafter, one or more embodiments of the present invention will be described with reference to the drawings. However, the scope of the invention is not limited to the disclosed embodiments.

Figure 1:
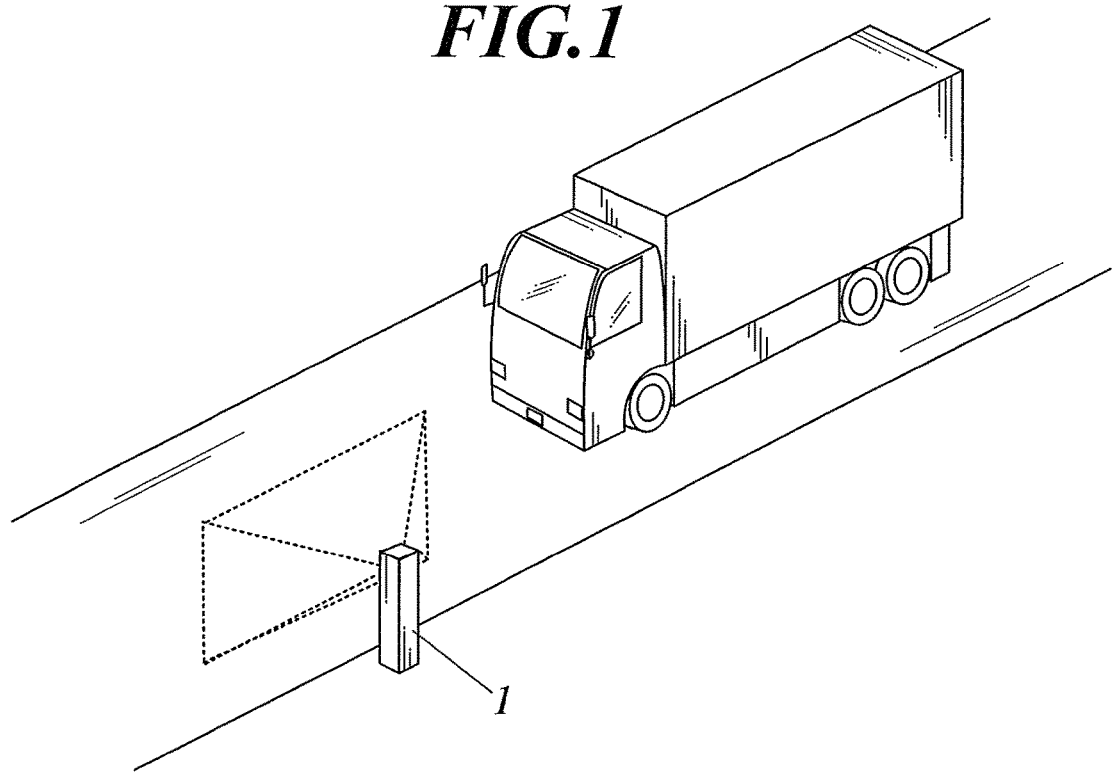
FIG. 1 is a schematic view of the overall configuration of an overload detecting system according to an embodiment.

FIG. 1 is a schematic view of the overall configuration of an overload detecting system 1 according to an embodiment. The overload detecting system 1 includes an imaging device 10 (camera) and a processor 20 functioning as a tire deformation calculator.

An example of the imaging device 10 captures moving images on a two-dimensional plane or consecutive still images at predetermined intervals. The images captured by the imaging device 10 are digital images. The imaging device 10 directly outputs digital image data generated through the image capturing to the processor 20.

The processor 20 analyzes the digital image data from the imaging device 10, calculates the tire deformation, and determines whether the loading weight exceeds a specified value (load limit) on the basis of the calculated tire deformation.

Figure 2:
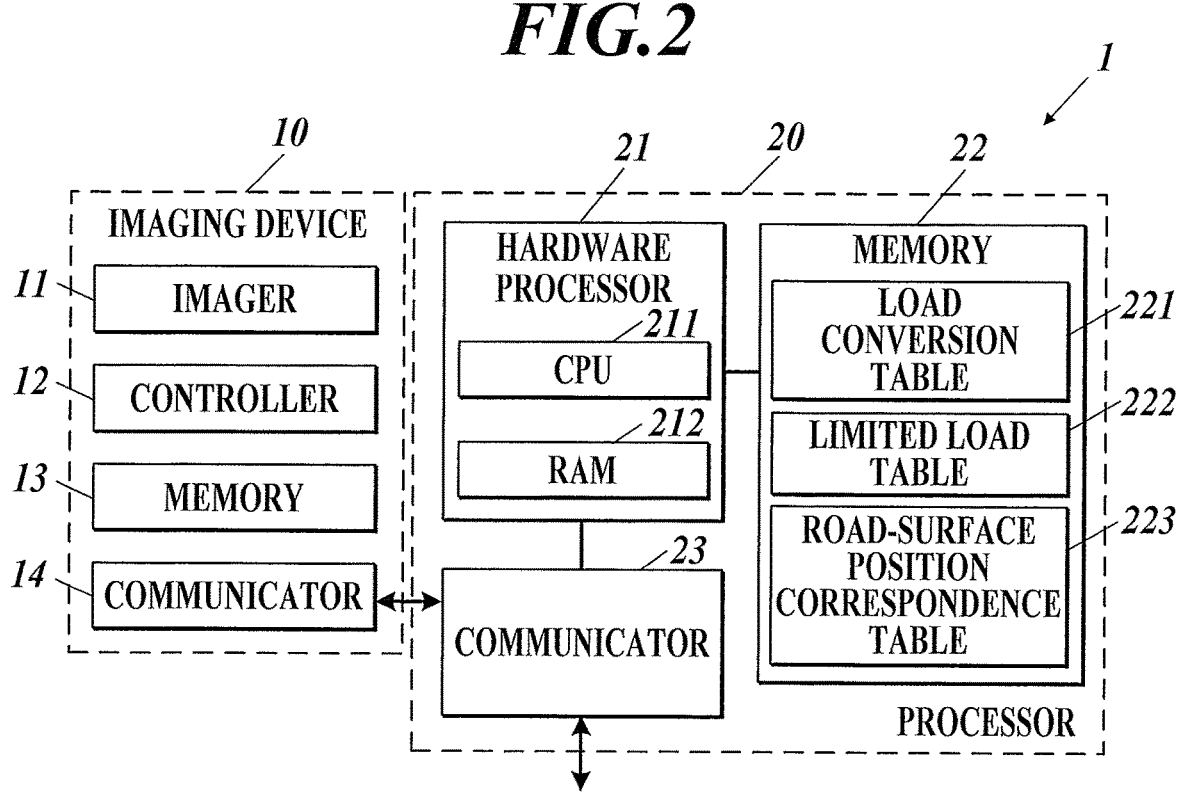
FIG. 2 is a block diagram of the functional configuration of the overload detecting system.

FIG. 2 is a block diagram of the functional configuration of the overload detecting system 1.

The imaging device 10 includes an imager 11, a controller 12, a memory 13, and a communicator 14. The imager 11 includes an optical device that guides external visible light to pixel positions and a detector that detects the intensities of RGB color light beams at the pixel positions. The detector includes a two-dimensional array of imaging elements on an imaging plane so as to acquire pixels values (for example, the intensities (luminances) of the RGB color light beams) of the pixel positions and thereby two-dimensional image data. The controller 12 controls the timing of image capturing by the imager 11. The intensity (luminance) data items acquired through the operation of the imager 11 is output to the memory 13 in a predetermined order. The controller 12 outputs the image data temporarily stored in the memory 13 to the processor 20 via the communicator 14 at an appropriate timing.

The processor 20 is a computer that carries out a calculation process and includes a hardware processor 21 (detector, calculator, identifier, conversion value acquirer, determiner), a memory 22, and a communicator 23.

The hardware processor 21 is a processor that comprehensively controls the operation of the processor 20. The hardware processor 21 includes a central processing unit (CPU) 211 that carries out various calculation processes and a random access memory (RAM) 212 that provides a memory space for the operation of the CPU and stores temporary data.

The memory 22 stores various programs, predetermined operational data, recorded image data, and analytical results of these data items. The memory 22 may be a non-volatile memory, such as a rewritable flash memory, or a hard disk drive (HDD). The programs and initial operational data may be stored in a mask ROM.

One of the programs is for analysis of the image data sent from the imaging device 10. The CPU 211 of the hardware processor 21 reads the programs and the operational data in the memory 22, stores them in the RAM 212, and executes the programs. The operational data includes a load conversion table 221, a limited load table 222, and a road-surface position correspondence table 223.

The load conversion table 221 contains table data for converting parameters related to the deformation (load deformation) of a tire calculated by the processor 20 to loading weight (the correspondence between the load deformation and the loading weight of the vehicle). Two or more load conversion tables 221 may be separately provided corresponding to tire size, tire type, and/or vehicle type, for example. The term "load" refers not only to the weight of a load but also the weight of the vehicle including the load carrier.

The limited load table 222 stores the loading weights of the vehicles (including the vehicle weights) for every vehicle type.

The road-surface position correspondence table 223 stores the correspondence between the pixel positions of the image captured by the imaging device 10 and the positions on a road surface (i.e., two-dimensional plane) captured in the image.

The communicator 23 controls the communication with an external unit. The communicator 23 is, for example, a network card that receives image data from the imaging device 10 and outputs signals corresponding to the results of the image data analyzed by the hardware processor 21 to the external unit. Examples of such an external unit include a notifier that notifies the driver of the vehicle of an overload, an operation controller for a crossing bar that stops an overloaded vehicle, and a monitoring device used by a monitor.

The process of calculating the tire deformation by the processor 20 according to this embodiment will now be explained.

Figure 3A:
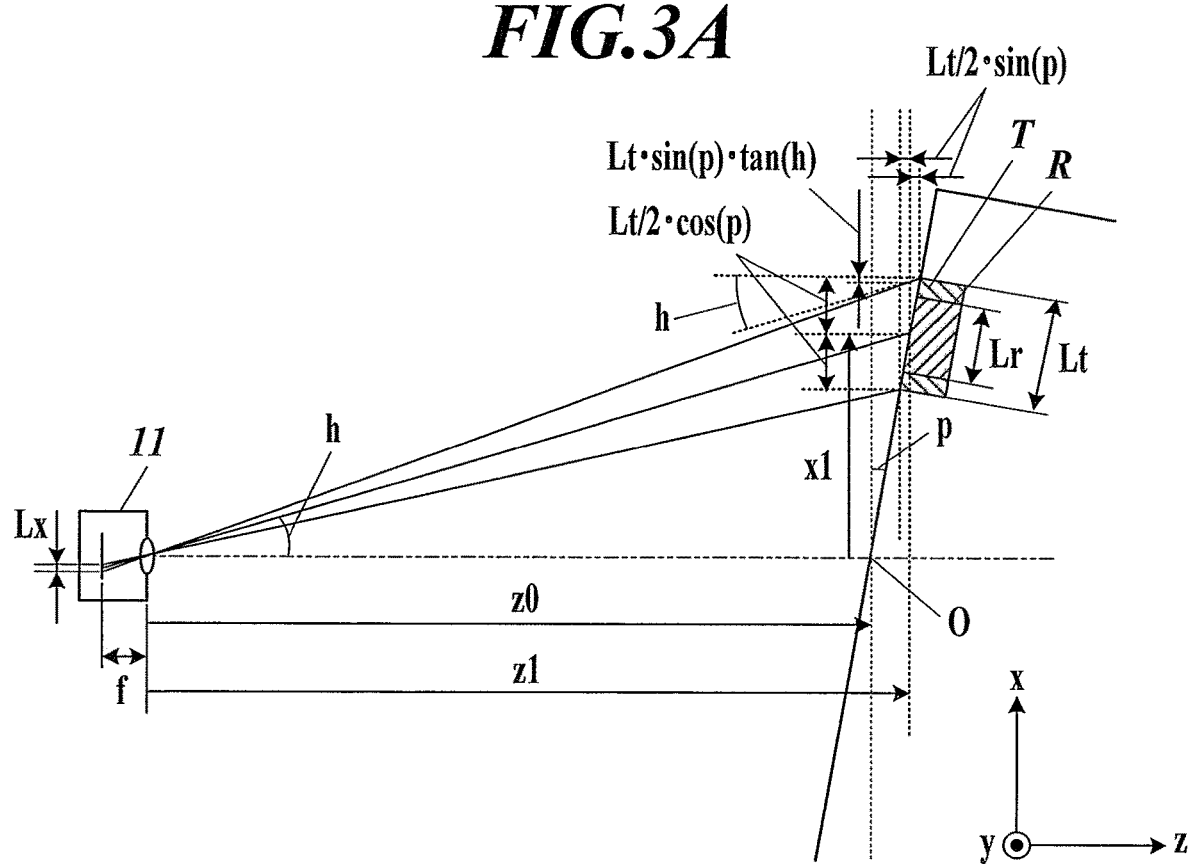
FIG. 3A illustrates the apparent shape of a target tire for image capturing.
Figure 3B:
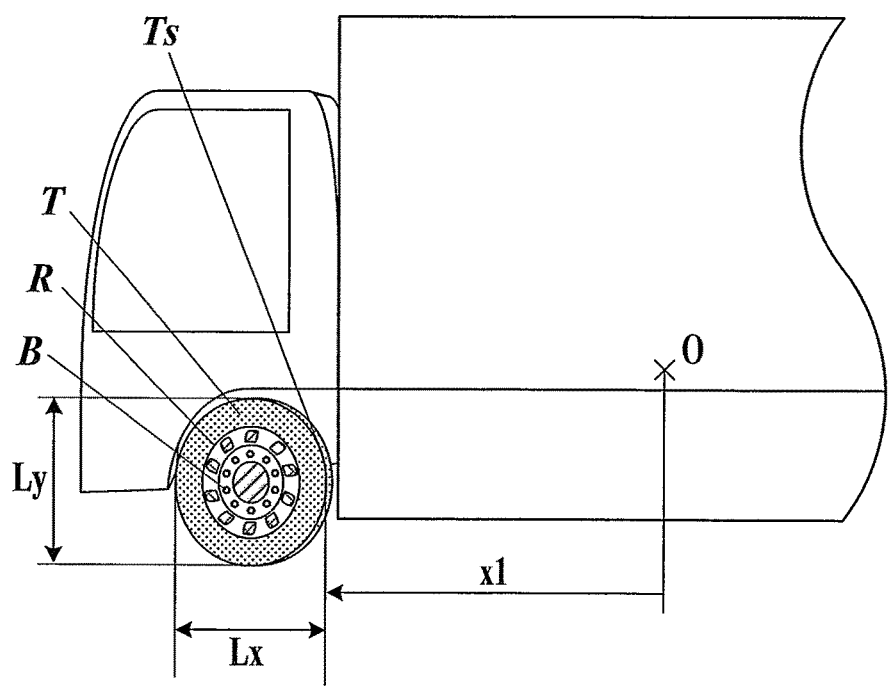
FIG. 3B illustrates the apparent shape of a target tire for image capturing.

FIGS. 3A and 3B illustrate the apparent shape of a target tire in a captured image. The process for a tire T without deformation will now be explained.

The imaging device 10 discretely captures either still images or moving images. Thus, the tire of a target vehicle is not always right in front of the imaging plane. Moreover, the distance to the tire is not always constant. FIG. 3A illustrates the relative position between the imaging device 10 and the tire T in such a case. The z direction is the range direction from the image plane, the x direction or horizontal direction is the traveling direction of the vehicle on a plane parallel to the imaging plane, and the y direction is the vertically upward direction.

The side face of the target vehicle at a front position O is disposed at a distance $z0$ from the imaging plane. The distance from the front position O to the tire T in the x direction is $x1$. The vehicle and the tire T having a diameter (outer diameter) $Lt$ are disposed on the xz plane at an inclination angle p ($-90<p<90$ deg) to the imaging plane. In the case where the contour Ts of the side face of the tire T is disposed on a plane at the distance $z0$, the apparent diameter $La$ (outer diameter) of the tire T in an image captured by the imaging device 10 having a focal length f is defined by $La = Lt \cdot f/z0$. In the case where the contour Ts of the side face is disposed at an inclination angle p, the two edges of the tire T remote from the front position O in the x direction are shifted from the position of the tire T measured from the plane parallel to the imaging plane and disposed at the respective positions $(x1 \cdot \tan(p) \pm Lt/2 \cdot \sin(p))$. This causes the apparent length $Lx$ in the horizontal direction (short axis direction) passing through the center of the contour Ts of the side face of the tire T to differ from the diameter $La$ (outer diameter). The horizontal length $Lx$ on the imaging plane is defined by $Lx = Lt \cdot f \cdot z0 \cdot \cos(p)/((z0+x1 \cdot \tan(p))^2 - (Lt/2 \cdot \sin(p))^2)$, where f is the focal length of the lens. In the case where $Lt/2 \cdot \sin(p)$ is significantly smaller than $z1$, (i.e., in the case where the angle p is small), the length $Lx$ can be simplified to $Lx = f/z1 \cdot Lt \cdot (\cos(p) - \tan(h) \cdot \sin(p))$, where $z1 = z0 + x1 \cdot \tan(p)$.

Here, the contour Ts of the side face may exclude depressions and projections, such as grooves, on the surface of the tire T. The side face of the tire T is not a completely flat surface but may be approximated to a flat surface.

Line segments passing through the center of the contour Ts of the side face of the tire T in the vertical direction are parallel to the imaging plane. Thus, the apparent length $Ly$ of the contour Ts of the side face of the tire T in the vertical direction (long axis direction) is only affected by the distance $z1$ from the plane parallel to the imaging plane, as illustrated in FIG. 3B. In specific, the length $Ly$ on the imaging plane is defined by $Ly = Lt \cdot f/z1$.

The tire T is attached to the rim R of a wheel. The wheel is attached to the vehicle with a plurality of wheel bolts B (for fixing the wheel) and wheel nuts disposed symmetrically around the center of the contour Ts of the side face. In specific, the wheel bolts B are disposed in a regular polygonal pattern. The tire T is compressed and thereby deformed at the contact surface, whereas the rim R and the geometry of the wheel bolts B are not deformed and thus their shapes are maintained in a perfect circle and a regular polygon, respectively. The rim R and the wheel bolts B are disposed concentrically with the contour Ts of the side face and on a plane parallel to the contour Ts of the side face (the parallel plane and the concentric center may be slightly misaligned within a precision range required by the structure). Thus, any deviation of the shape and the geometry from a perfect circle and a regular polygon, respectively, in a captured image is caused by the positional relationship between the wheel and the imaging plane, as described above. Here, distortion or aberration of the optical device of the imager 11 is significantly small and thus ignored. In the case where the distortion cannot be ignored, it may be preliminarily corrected by a known technology.

The length Lrx in the x direction and the length Lry in the y direction of the rim R on the imaging plane are determined by replacement of the diameter Lt of the tire T in the above-described expressions defining the lengths Lx and Ly with the diameter Lr of the rim R. The ratio of the length Lrx to the length Lry is determined from the captured image data to cancel out the focal length f. Analytical or numerical approximation may be appropriately carried out depending on the conditions. For example, in the case where the inclination angle p is significantly small as described above, the ratio Rab is analytically defined by Rab=Lrx/Lry=(cos (p)−x1/z1·sin(p)). A significantly large inclination angle p can be omitted from consideration in an overload detection area by selecting a portion of the road, for example, without a sharp curve and prohibiting lane changing. In this way, the inclination angle p can be appropriately approximated.

Also, in the case where the length of a line segment (diagonal line) connecting two wheel bolts B disposed symmetrically about the center (position of the shaft) is equal to the diameter Lr, the values described above can be determined. In such a case, the lengths Lx and Ly may be determined by fitting an oval to the geometry of the wheel bolts B in the captured image. Alternatively, the lengths Lx and Ly may be determined by determining the distances between two vertices of the polygonal pattern in the vertical direction and two vertices in the horizontal direction, respectively.

The ratio Rab is independent of the diameter Lr. In specific, the ratio Rab is a constant for the tire T and the rim R concentrically disposed (having the same center). Thus, the contour Ts of the side face of the tire T in the captured image can be converted to a perfect circle having a converted diameter Lv determined by multiplying the diameter La with a constant, which corresponds to the shape of the contour Ts of the side face disposed on a plane parallel to the imaging plane, by dividing each of the x-direction components of the positions on the contour Ts of the side face required for the calculation of deformation by the ratio Rab or multiplying each of the y-direction components with the ratio Rab, without specifically determining the distances x1 and z1 and the angle p.

Figure 4A:
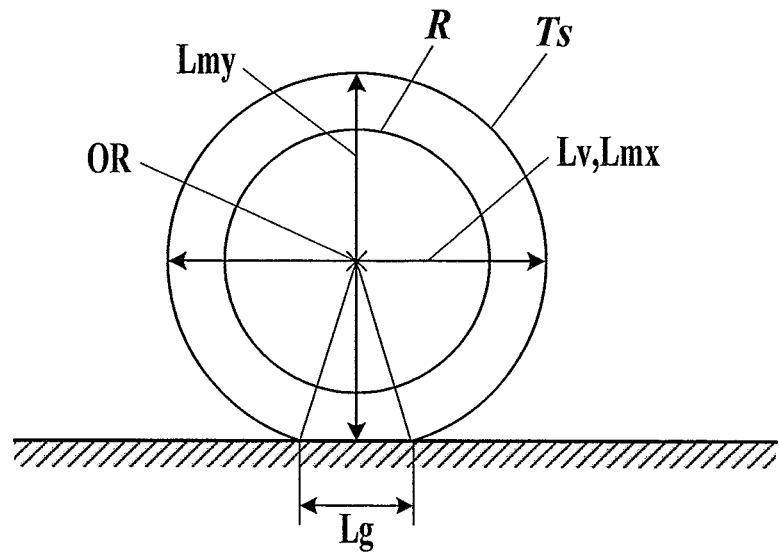
FIG. 4A illustrates the calculation of the deformation of a tire.
Figure 4B:
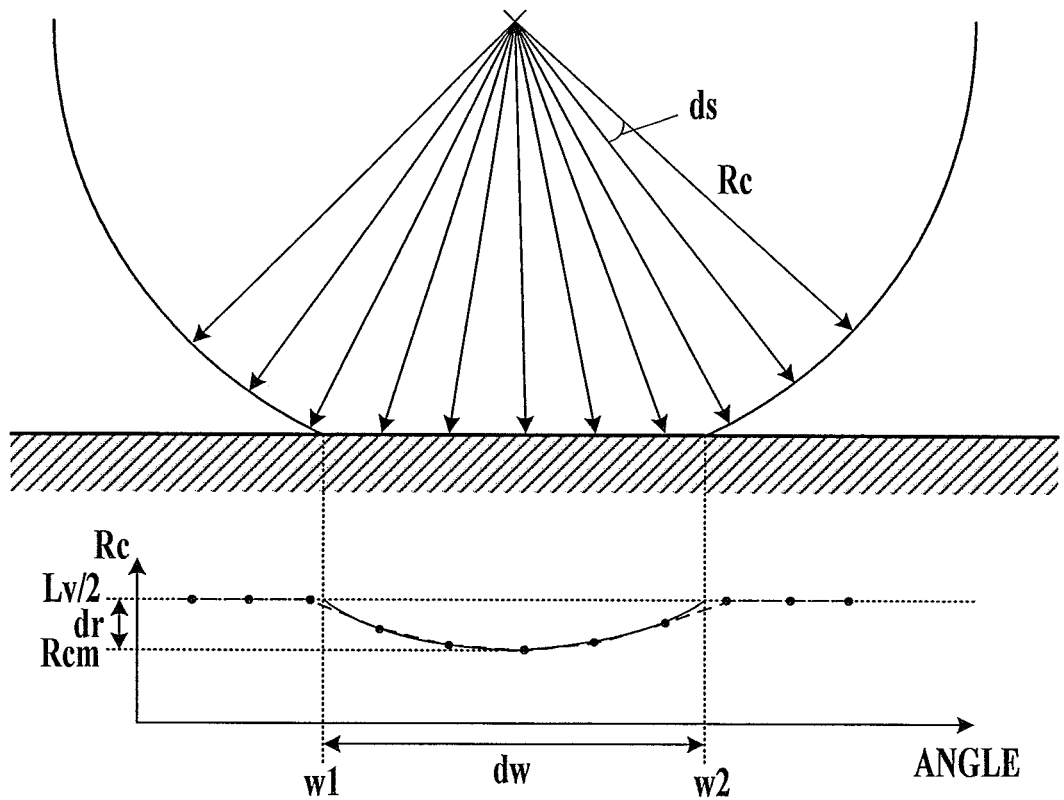
FIG. 4B illustrates the calculation of the deformation of a tire.

FIGS. 4A and 4B illustrate the calculation of the deformation of the tire T.

The processor 20 converts the shape of the tire T (i.e., the contour Ts of the side face) in the captured image into a shape viewed from the front and calculates the deformation of the tire T (i.e., the contour Ts of the side face), as described above.

When a load is applied to the tire T, the contact area with the ground is compressed, as illustrated in FIG. 4A. This causes the lengths of the line segments each connecting two points on the contour Ts of the side face, one of which is a point on the portion of the contour Ts of the side face corresponding to the contact area of the tire T, and passing through the center (which is the center of the circle corresponding to the arc of the undeformed portion of the contour Ts of the side face without contact with the ground) to be smaller than the actual diameter Lt of the tire T. Thus, among the converted values Lm each converted from the apparent length of each line segment connecting two points on the contour Ts of the side face via the center of the tire T in the captured image, the line segment corresponding to the converted value Lmy extending in the vertical direction (short axis direction) is smaller than the converted diameter Lv, which is equal to the converted value Lmx or the line segment extending in the horizontal direction (long axis direction). The contact area of the tire T extends linearly along the contact length Lg, as illustrated in FIG. 4B (However, the contact area is actually planar and thus also extends to the back of the drawing). As the load increases, the converted value Lmy decreases and the contact length Lg increases. Thus, the converted value Lmy, the contact length Lg, and values corresponding to the converted value Lmy and the contact length Lg, such as the distance Rc from the center to the contour Ts of the side face, the contraction dLm=Lmx−Lmy (i.e., the difference between the maximum length and the minimum length of line segments), and the contact angle dw (angular range) that is the central angle of the contact length Lg, can be defined as parameters (predetermined values) corresponding to deformation. The deformation rate of the tire T may be determined on the basis of multiple converted values Lm (the lengths of line segments in the captured image), such as the ratios of the values mentioned above to the converted diameter Lv=Lmx, for example, Lmy/Lmx, dLm/Lmx, and Lg/Lmx (the ratio of the diameter to the contact length).

The minimum distance Rcm or smallest distance Rc is a portion of the line extending in the vertical direction and corresponding to the converted value Lmy, if the road surface is horizontal. If the vertical direction can be determined in the image captured by the imager 11, the length Rc in the vertical direction can be directly determined. The vertical direction can be determined, for example, in the case where the image capturing range of the imager 11 is fixed in the vertical and horizontal directions or where a marker indicating the vertical direction is provided on the image target.

The distance Rc is determined by determining the center OR of the contour Ts of the side face of the tire T and then determining the distance from the center OR to the contour Ts of the side face. The center OR of the tire T (the center of the circle including the undeformed arc in the captured image) matches the center of the rim R, in this case. Thus, the center of the rim R, which is required for the conversion of the shape of the rim R in the captured image to a perfect circle, can be determined to be the center of the tire T. Alternatively, the center of the tire T can be determined to be the intersection of the line segment having the maximum vertical length of the contour Ts of the side face of the tire T and the line segment having the maximum horizontal length.

If the distance x1 is not determined, the distance Rc may be determined without determination of the center OR. In specific, the distance Rc can be defined by Rc=Lm−(Lmx/2). The minimum distance Rcm is thereby defined by Rcm=Lmy−(Lmx/2).

The minimum distance Rcm may be numerically calculated, instead of determining the minimum vertical distance Rcm along the precise vertical direction in the captured image. For example, the distances Rc from the center of the tire T to the contour Ts of the side face are sequentially determined at predetermined angular intervals ds. The minimum distance Rcm can then be determined through fitting (determining the distribution of the distances from the points on a chord defined by the contact area to the center) or interpolation of the portion having distances Rc smaller than or different from the converted length (Lv/2)=(Lmx/2) corresponding to the actual tire radium (Lt/2), which is the maximum value. Similarly, the contact angle dw=w2−w1 is determined by the difference between the angles w1 and w2 at the two ends of the chord determined through the fitting.

In the calculation of the tire deformation, the processor 20 should convert only the positions, lengths, and angular range of the contour Ts of the side face of the tire T retrieved from the data of a captured image that are required for the acquisition of a parameter required for determination of the deformation, to those of the contour Ts of the side face viewed from the front. In other words, the contour Ts of the entire side face does not necessarily have to be converted to that viewed from the front.

Figure 5:
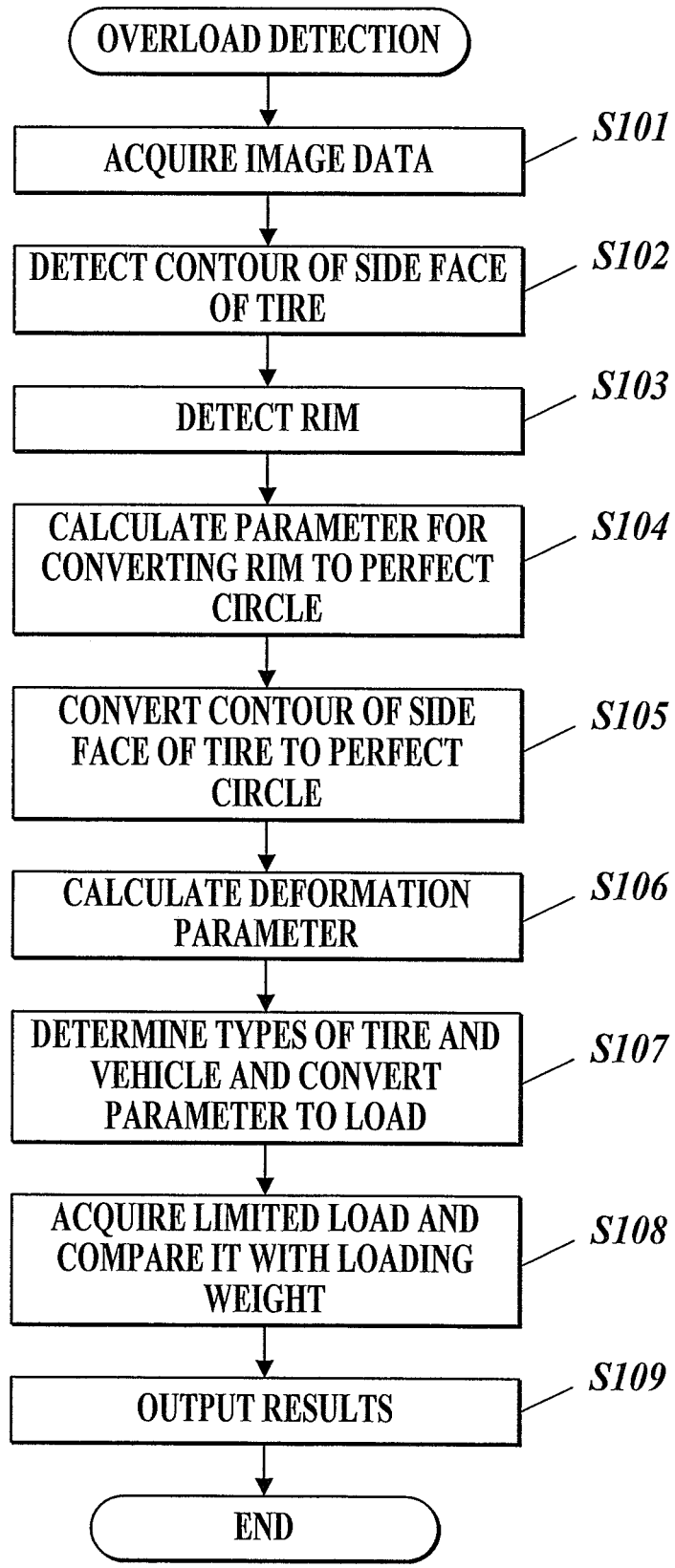
FIG. 5 is a flow chart illustrating the control process for the detection of overload carried out by a processor according to an embodiment.

FIG. 5 is a flow chart illustrating the control process for the detection of overload carried out by the processor 20 according to this embodiment. The processor 20 starts this process every time it receives data of an image from the imaging device 10.

After the start of this overload detection process, the hardware processor 21 (CPU 211) acquires captured image data that is to be analyzed (step S101). The hardware processor 21 detects the tire (the contour of the side face of the tire) attached to a wheel of the vehicle in the captured image (step S102; operation of detector, detecting steps). The tire may be detected through any scheme, for example, detection of the shape of the vehicle. The detection may be carried out on consecutive images, in regions corresponding to movement (the regions having differences among the images).

The hardware processor 21 detects a circle shape (a circular or polygonal shape or pattern), which may include distortion within an error range, in the inner area of the detected tire (step S103; operation of an identifier, an identifying step). The target of the detection or identification is an object that is preliminarily identified to have a circular shape, which in this case is the rim of the wheel. The rim is detected as a circle having a center near the center of the detected tire (the center of the rim is not precisely determined at this point) through detection or identification of the border between the tire and a region having a color different from the color of the tire. The circular or polygonal objects to be detected includes not only a perfect circle or a perfect regular polygon, respectively, but also a portion of a perfect circle or a portion of a regular polygon, respectively.

The hardware processor 21 calculates a parameter for correcting the shape of the rim into a perfect circle (step S104; operation of conversion value acquirer, conversion value acquiring step). The hardware processor 21 determines a parameter for converting the apparent shape of the rim, which is not a perfect circle, to a perfect circle, as described above.

The hardware processor 21 converts the shape of the contour Ts of the side face of the tire T on the basis of the determined parameter (step S105). The hardware processor 21 calculates one of the above-mentioned parameters indicating the deformation on the basis of the converted shape of the contour Ts of the side face of the tire T (step S106). Steps S105 and S106 are carried out by the hardware processor 21 functioning as the calculator and correspond to the calculating steps of the method of calculating tire deformation according to this embodiment.

The hardware processor 21 identifies the types of the tire and the vehicle on the basis of the determined tire size and other values and calculates the loading weight from the parameter indicating deformation (step S107). The hardware processor 21 may directly identify the types on the basis of indicators, such as characters and symbols provided on the tire and the vehicle, or through pattern matching of the shapes of the tire and the vehicle. The hardware processor 21 retrieves the load limit corresponding to the tire type and the vehicle type from the limited load table 222. The hardware processor 21 compares the calculated loading weight with the load limit to check whether the calculated loading weight exceeds the load limit (checks for overload) (step S108). Steps S107 and S108 are carried out by the hardware processor 21 functioning as the determiner.

The hardware processor 21 outputs the result on the calculated loading weight (step S109). The hardware processor 21 then ends the overload detecting process.

In the process described above, the distance (target distance) from the imager 11 to the tire (target), i.e., the absolute values of the dimensions of the tire T are not taken into consideration. However, the dimensions of the tire T are required in some cases to determine the tire type and strength corresponding to the tire type. With reference to FIGS. 3A and 3B, the dimensions (lengths Lx and Ly) of the tire T in the captured image depend on the distance z1 (to be precise, the length Lx also depends on the distance x1).

Figure 6A:
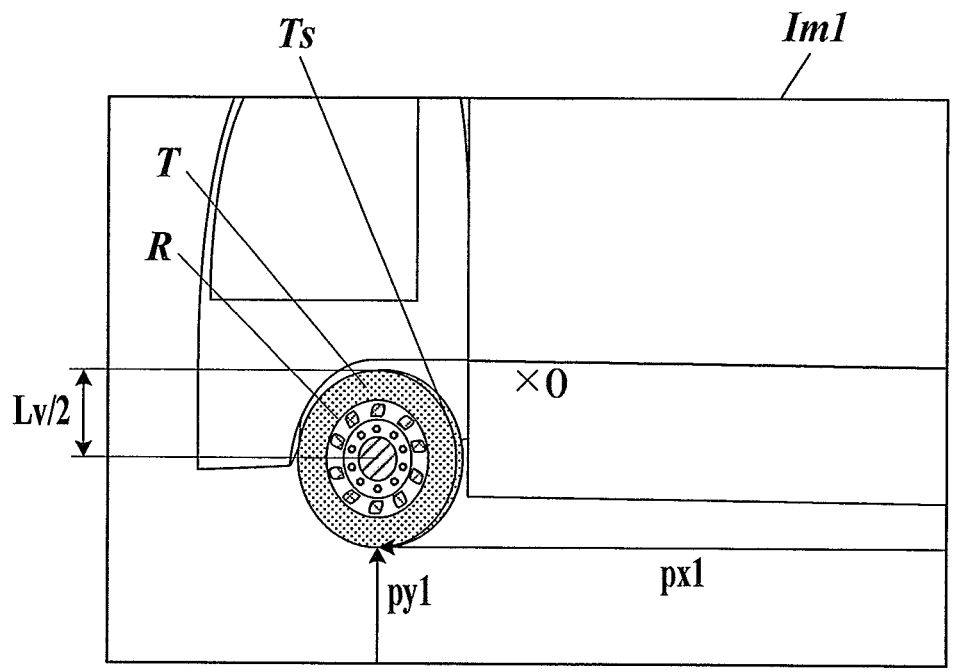
FIG. 6A illustrates determination of the distance between an imaging plane and a target tire.
Figure 6B:
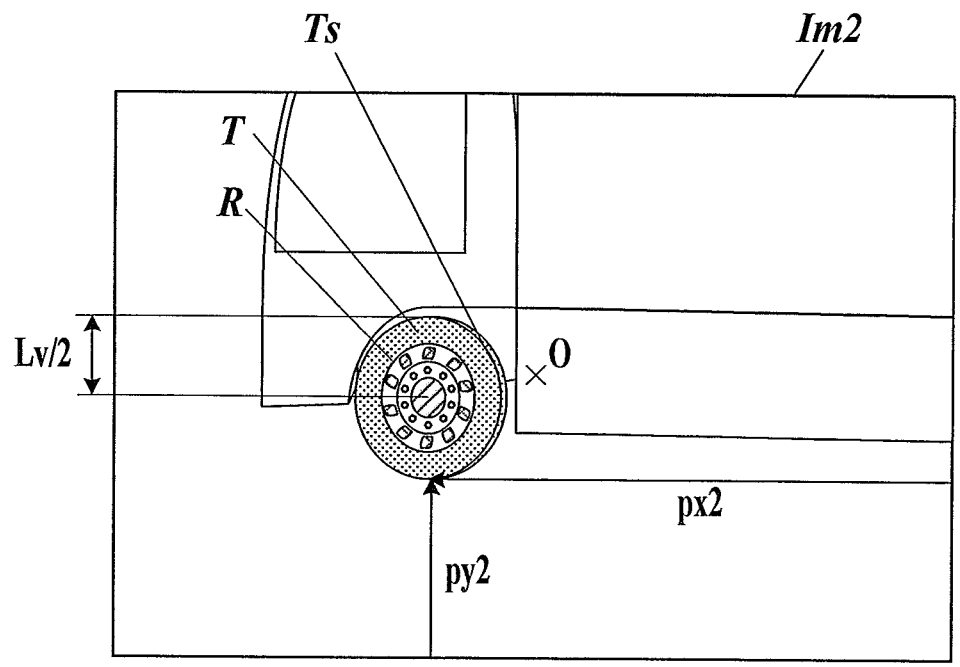
FIG. 6B illustrates determination of the distance between an imaging plane and a target tire.

FIGS. 6A and 6B illustrate the determination of the distance between an imaging plane and the target tire T.

Positions on the ground surface corresponding to the positions of the pixels of the captured image are determined if the imager 11 is disposed at a fixed position at a constant angle of view (focal length). Thus, the distances z1 and x1 can be determined on the basis of the distances between reference points (predetermined reference positions), such as the four corners of the captured image, and the contact point of the tire T (the intermediate point of the line segment having a contact length Lg). For example, with reference to FIG. 6A, the length between the right bottom corner in the captured image Im1 and the center of the contact length Lg of the tire T is defined by a leftward length px1 and an upward length py1.

The coordinates (px1,py1) are stored in the road-surface position correspondence table 223 in the memory 22 in correspondence with a predetermined y value or the position (x,z) on the road surface. The position (x,z)=(x1,z1) at the center of the contact length Lg of the tire T corresponding to the determined length px1 and py1 can be retrieved from the road-surface position correspondence table 223. The diameter La of the tire T in the captured image Im1 is determined to derive the actual diameter Lt=La·z1/f of the tire T, where f is the known focal length.

In the captured image Im2 illustrated in FIG. 6B, the length py2 is larger than the length py1, and the length px2 is smaller than the length px1. In such a case, the vehicle is passing through a position farther from the imaging plane than in the case illustrated in FIG. 6A. The tire radius Lv/2 in the captured image illustrated in FIG. 6B is smaller than that in FIG. 6A. To determine the diameter Lt of the tire T in such a case, the distances z1 and x1 are first determined on the basis of the lengths px1, px2, py1, and py2.

Figure 7A:
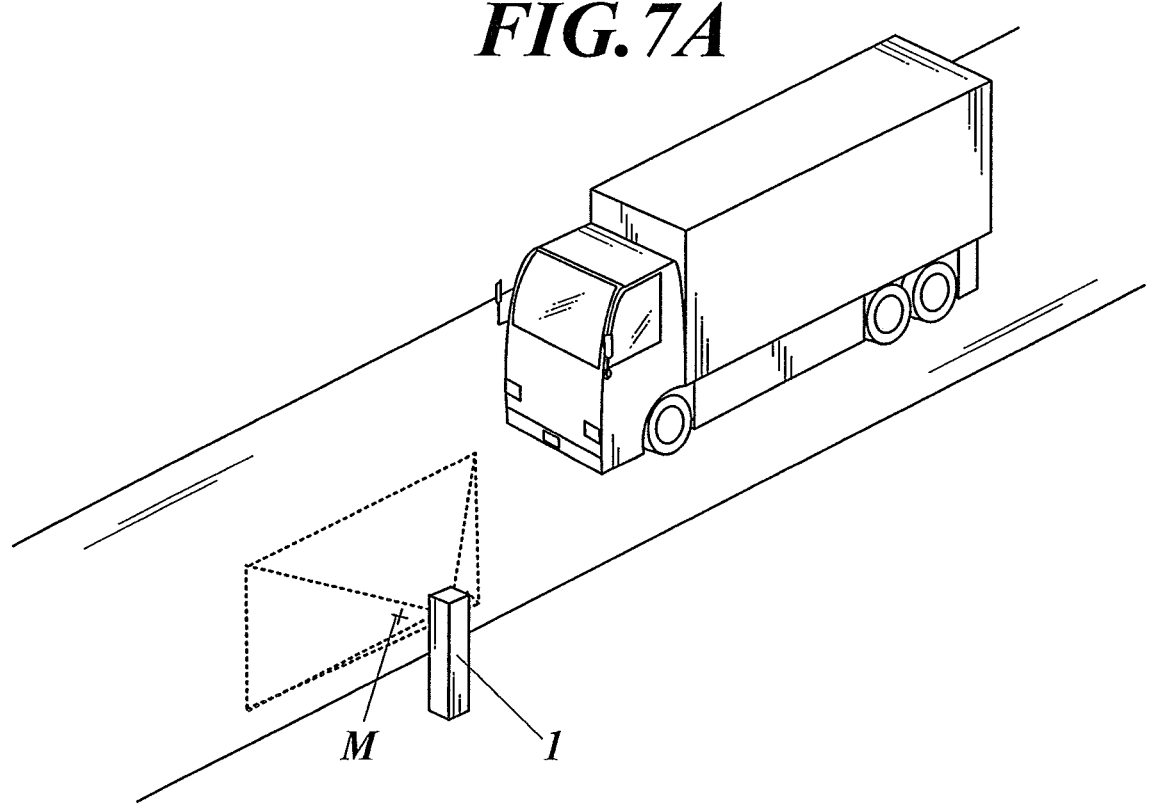
FIG. 7A illustrates another method of determining the distance between an imaging plane and a target tire.
Figure 7B:
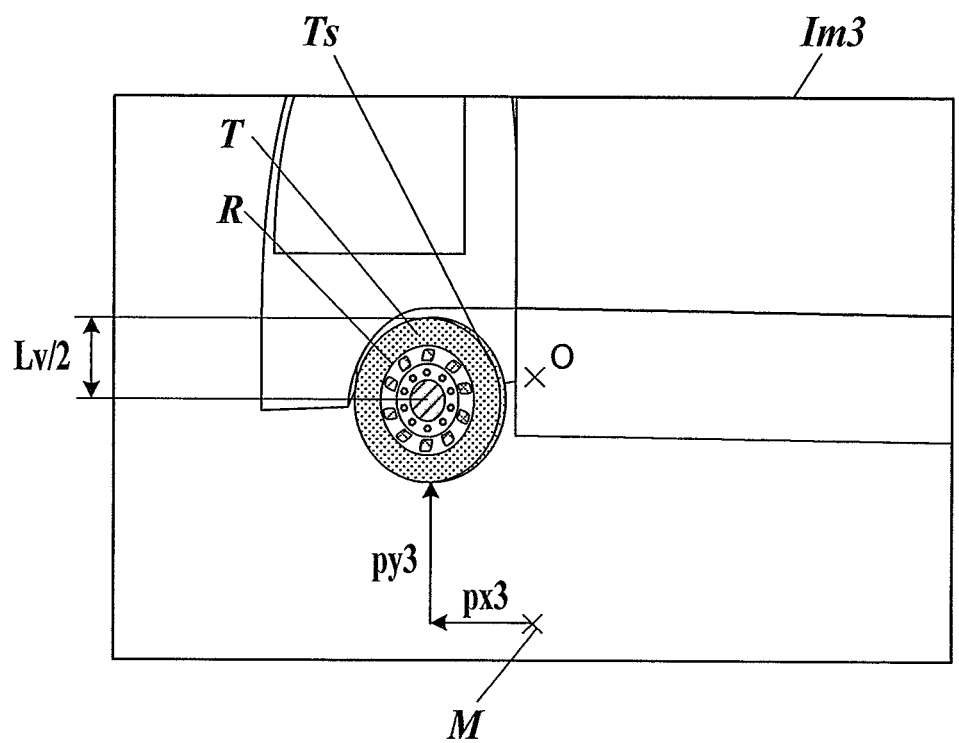
FIG. 7B illustrates the other method of determining the distance between an imaging plane and a target tire.

FIGS. 7A and 7B illustrate another method for determining the distance between the imaging plane and the target tire T.

A marker M is disposed on the road, as illustrated in FIG. 7A. A captured image Im3 includes both the marker M and the tire T, as illustrated in FIG. 7B. The position (x,z) of the marker M in an image captured by the imager 11 is preliminarily stored in the memory 22. The position (px3,py3) of the marker M relative to the tire T in the captured image Im3 is stored in the road-surface position correspondence table 223 in relation to the position (x,z) on the road surface. In this way, the distances x1 and z1 are determined from the relative position (px3,py3).

Figure 8:
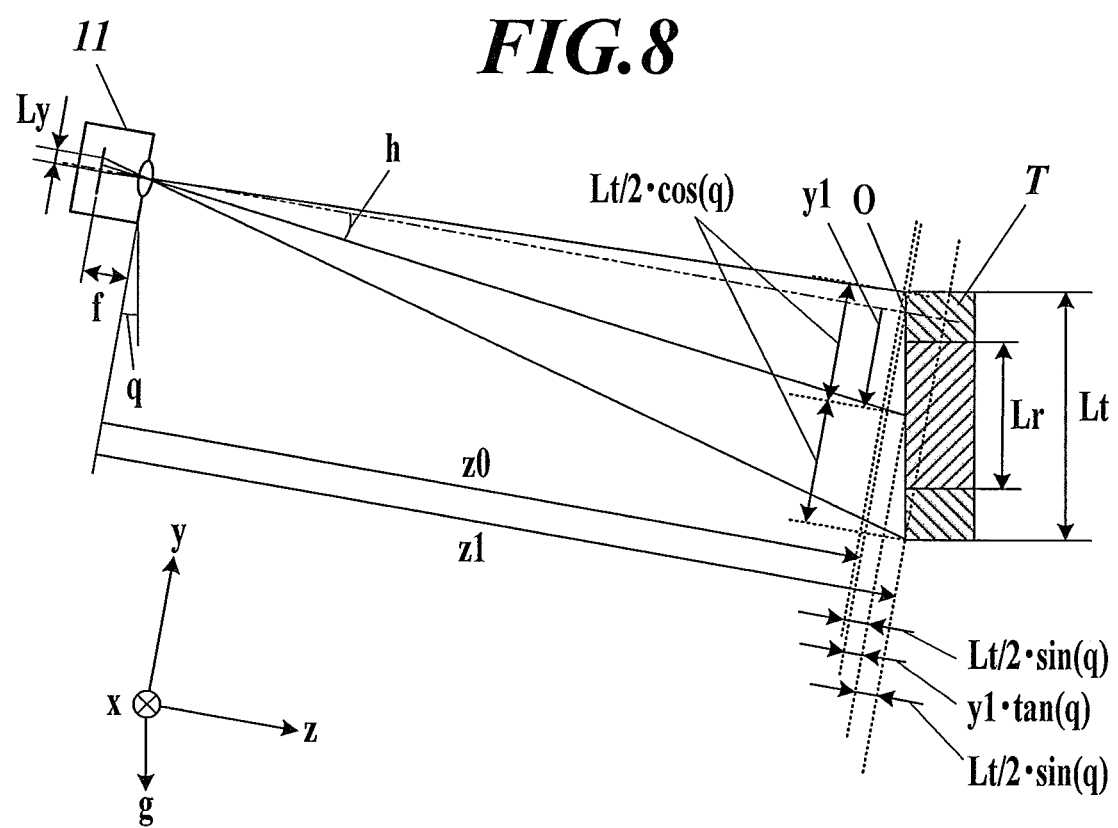
FIG. 8 illustrates an overload detecting system according to a modification of an embodiment.

FIG. 8 illustrates the overload detecting system 1 according to a modification of an embodiment.

In FIG. 8, the downward direction is the vertical direction (g direction).

The imager 11 captures an obliquely downward image from a position slightly higher than the road surface or the center of the tire T. Here, the tire tilts by an angle q to the imaging plane (tilts by the angle between the contour Ts of the side face and the imaging plane) on the yz plane. This causes the apparent length Ly in the y direction in the captured image to differ from the converted diameter Lv. Such a tilt can also be converted into that in the case where the tire T is viewed from the front, as in the above-described tilt on the xz plane.

In the case where the tire T tilts in both the xz and yz planes, similar conversion can be carried out on both planes. In such a case, the deformation may be calculated after converting the contour Ts of the entire side face; or the deformation may be acquired by acquiring multiple line segments each connecting two points on the contour Ts of the side face via the center from the captured image, converting these line segments, and acquiring the deformation on the basis of the maximum and minimum values and the distribution of lengths of the converted line segments.

As described above, the processor 20 according to this embodiment includes the hardware processor 21 that functions as a detector, a calculator, an identifier, and a conversion value acquirer. The hardware processor 21 functioning as the detector detects the contour Ts of the side face of the tire T attached to the wheel of the vehicle in the image captured by the imaging device 10. The hardware processor 21 functioning as the calculator calculates the deformation of the contour Ts of the side face corresponding to the weight of the vehicle. The hardware processor 21 functioning as the identifier identifies a circular or polygonal shape or pattern on a plane parallel to the contour Ts of the side face. The hardware processor 21 functioning as the conversion value acquirer determines the conversion value for converting the shape or pattern identified in the captured image to a perfect circle or a regular polygon.

The hardware processor 21 functioning as the calculator calculates a predetermined value (parameter) corresponding to the deformation of the tire T in the captured image on the basis of the conversion value determined by the conversion value acquirer and calculates the deformation on the basis of the calculated predetermined value.

In this way, the processor 20 appropriately converts the coordinates of the contour Ts of the side face of the tire T tilted to the imaging plane to coordinates corresponding to a contour Ts of the side face viewed from the front and calculates the tire deformation on the basis of the resulting contour Ts of the side face. Thus, accurate deformation can be determined by capturing images of the tire T at appropriate intervals while the vehicle is running, even without capturing an image of the tire T at the moment the tire T comes right in front of the imager 11. Thus, the image capturing intervals are not required to be significantly small relative to the running speed of the vehicle. Furthermore, accurate deformation can be determined even when the vehicle is running in a direction not parallel to the imaging plane. This can prevent vehicles from escaping the measurement of overload. Thus, the processor 20 can more practically detect the deformation of a tire of a vehicle due to overload.

The hardware processor 21 functioning as the identifier identifies a circular or polygonal shape or pattern in the inner area of the contour Ts of the side face in the captured image. In specific, the hardware processor 21 detects a circular shape in the wheel. Thus, the shape of the contour Ts of the side face of the tire T can be appropriately converted to that viewed from the front even when the wheel and the vehicle face in different directions.

The hardware processor 21 functioning as the identifier identifies the above-described shape or pattern disposed concentrically with the tire T. In this way, the hardware processor 21 can acquire a more accurate conversion value for the apparent difference of the tire T at the same position as the tire T. The center of the deformed tire T can also be readily determined.

The hardware processor 21 functioning as the identifier identifies the rim R of the wheel in the form of the shape or pattern described above. The rim R is concentric with the tire T and has a radius similar to that of the tire T. Thus, the conversion value can be determined with high accuracy.

The hardware processor 21 functioning as the identifier identifies multiple wheel bolts B fixing the wheel in the form of the shape or pattern described above. The wheel bolts B are disposed in a polygonal shape concentric with the tire T. Thus, the conversion value can be determined with high accuracy, similar to the case in which the rim R is used.

The hardware processor 21 functioning as the identifier identifies a shape or pattern having a color different from that of the contour Ts of the side face of the tire T. Thus, the shape or pattern can be readily and accurately extracted from the captured image. This acquires a highly accurate conversion value.

The hardware processor 21 functioning as the conversion value acquirer determines the ratio of the length of the long axis to the length of the short axis of the shape or pattern to be a conversion value and functioning as the calculator to calculate the parameter indicating deformation from the resulting ratio. By simply determining the ratio of the two axes of an oval to be the conversion value, a parameter indicating deformation of the contour Ts of the side face can be appropriately acquired through simple calculation without a significant decrease in accuracy.

The hardware processor 21 functioning as the conversion value acquirer determines a conversion value corresponding to the angles p and q between the contour Ts of the side face and the imaging plane of the captured image. In specific, the hardware processor 21 can accurately calculate a conversion value not only when the vehicle is running at an angle to the imaging plane but also when the imager 11 is tilted. The tilted imager 11 capturing an image from a position slightly higher than the ground surface can prevent contamination of the imaging plane (the face through which light enters to the imaging plane) due to mad splash by a running vehicle. The slightly downward direction of image capturing can reduce contamination of the imaging plane, for example, due to raindrops.

The hardware processor 21 functioning as the conversion value acquirer acquires a conversion value on the basis of the target distance z1 between the imaging plane of the captured image and the contour Ts of the side face. In specific, the hardware processor 21 can acquire a more accurate conversion value. Moreover, the absolute value of the actual converted diameter Lv can be accurately determined on the basis of not only the ratio of the deformation indicated by values, such as the contact length Lg and the contraction dLm, to the converted diameter Lv but also the target distance z1, to readily identify the size and type of the tire and thereby more appropriately determine overload.

The hardware processor 21 functioning as the conversion value acquirer determines the target distance z1 on the basis of the distance between a predetermined reference position (right bottom corner) of a captured image (for example, the captured image Im1) and the contour Ts of the side face (in this case, the center of the contact length Lg). The constant angle of view of the imager establishes the correspondence relationship between positions (x,z) on the relatively still road surface and the pixels. Thus, the positions of the contour Ts of the side face in contact with the road surface can be readily determined. In this way, the target distance z1 is readily determined, and the conversion value for the parameter indicating deformation can be appropriately acquired.

The hardware processor 21 functioning as the calculator calculates the deformation on the basis of the vertical length Ly and the horizontal length Lx of the contour Ts of the side face converted to corresponding lengths in the contour Ts of the side face viewed from the front. In this way, the deformation of the tire T of a vehicle running in a direction deviating from the center of the angle of view of the imaging device 10 can be efficiently and appropriately determined.

The hardware processor 21 functioning as the calculator determines the lengths of multiple line segments each connecting two points on the calculated contour Ts of the side face via the center of the circle including the undeformed arc of the contour T of the side face and calculates the deformation on the basis of the lengths of the line segments. The lengths of multiple line segments are determined in directions besides the horizontal and vertical directions as described above, to numerically determine the distribution of the deformation in the contour Ts of the side face of the tire T. In this way, deformation can be flexibly and accurately determined on the basis of the distribution of deformation.

The hardware processor 21 functioning as the calculator calculates deformation on the basis of the difference between the maximum and minimum values of the determined lengths of the line segments. Such a simple process for calculating deformation can estimate the deformation, which can be used for determination of overload.

The hardware processor 21 functioning as the calculator calculates deformation on the basis of the contact length Lg of the converted contour Ts of the side face in contact with the road surface. Such a deformed portion can be readily and directly detected, and its deformation can be appropriately estimated and used in the determination of overload.

The hardware processor 21 functioning as the calculator determines the contact angle dw, which is the angular range in which the distance Rc between the center of the circle including the undeformed arc of the converted contour Ts of the side face and a point on the contour Ts of the side face differs from the maximum value (Lv/2), to determine the contact length Lg or a value corresponding to the contact length Lg. The tire T is a three-dimensional structure including grooves. Thus, the contour Ts of the side face cannot be clearly determined in a captured image in some cases. In such a case, the hardware processor 21 determines the most likely contact range on the basis of multiple data points instead of determining direct contact of the points with the ground. In this way, a value corresponding to the contact length Lg can be readily and appropriately determined without arbitrariness of determination and used for determination of overload.

The hardware processor 21 functioning as the calculator calculates the deformation on the basis of the ratio of the converted diameter Lv corresponding to the diameter of the circle including the undeformed arc of the converted contour Ts of the side face to the contact length Lg. The ratio of the contact length Lg, which is a parameter directly associated with overload, to the converted diameter Lv is determined, to define a parameter that more appropriately indicates whether the load is within an appropriate range relative to the diameter of the tire T. The parameter can be used to appropriately determine overload regardless of the diameter of the tire T.

The overload detecting system 1 according to this embodiment includes the above-described processor 20 functioning as the tire-deformation calculator and an imaging device 10 that captures images of a wheel of a vehicle. The hardware processor 21 of the processor 20 operates as a determiner that determines overload of the vehicle on the basis of the deformation of the tire T determined for the wheel captured by the imaging device 10. Thus, the processor 20, which determines the deformation of the tire T by flexibly adapting to the running state of the vehicle, as described above, can determine overload more certainly in various situations. In specific, the overload detecting system 1 can reduce the frequency of oversights of overload and more practically determine the overload. In the overload detecting system 1, the imaging device 10 needs not to be operated frequently in response to the running speed. Thus, costs are not required for the enhancement of the image capturing speed and the processing rate. Overload of a running vehicle can be determined on the side of the road. Thus, the driver of the vehicle is not bothered, and less maintenance and other troublesome operations are required.

The processor 20 (hardware processor 21), functioning as the determiner, includes the memory 22 storing the load conversion table 221 containing the correspondence relationship between deformation and loading weight of the vehicle. The hardware processor 21 retrieves the loading weight of the vehicle corresponding to the deformation from the memory 22.

In this way, the processor 20 can readily and appropriately retrieve the loading weight corresponding to the deformation with reference to the stored table data and quickly determine the overload under low processing load. Since multiple patterns of the different types of tires and vehicles are possible, these patterns can be stored in the form of a data table, to reduce the processing load of the processor 20.

The method for calculating the tire deformation according to this embodiment includes:

a detecting step of detecting the contour Ts of the side face of the tire T attached to the wheel of the vehicle in a captured image;

an identifying step of identifying a circular or polygonal shape or pattern, such as the rim R, in a plane parallel to the contour Ts of the side face;

a conversion value acquiring step of determining a conversion value for converting the identified shape or pattern in the captured image to a perfect circle or a regular polygon; and a calculating step of calculating a predetermined value indicating deformation of the tire T in the captured image from the conversion value determined in the conversion value acquiring step and calculating the deformation on the basis of the calculated predetermined value.

Such a method can determine accurate deformation by capturing images of the tire T at appropriate intervals from a running vehicle, even if an image is not captured in exact front of the tire T. Thus, the image capturing intervals are not required to be significantly small relative to the speed of the vehicle. Furthermore, the accurate deformation can be determined even when the vehicle is not running parallel to the imaging plane. This can prevent vehicles escaping from the measurement of overload. The method of calculating the tire deformation can more practically detect the deformation of a tire of a vehicle due to overload.

The present invention should not be limited to the embodiments described above and may include various modifications.

For example, the parameter indicating the deformation may be length, angle, or area. Area may be determined on the basis of the number of pixels, and the number of pixels or the unit area per pixel may be converted to those of an image of the front view, to relatively readily determine the deformation.

In the embodiment described above, the angle of the contour Ts of the side face on the imaging plane is acquired with reference to the rim R in the inner area of the contour Ts of the side face of the tire T. Alternatively, any component outside the inner area of the contour Ts of the side face that indicates the angle of the contour Ts of the side face may be used, such as a structure that moves in cooperation with the orientation of the vehicle shaft. Any undeformable structure may be used, for example, a pattern provided on the tire T.

In the embodiment described above, a structure originally provided on the wheel, such as the rim R or the wheel bolts B, is identified and used for the calculation of a conversion value. Alternatively, any other structure may be used. A separate circular pattern may be depicted on the tire T. The pattern may be eccentric relative to the shaft.

In the embodiment described above, the rim R and the wheel bolts B have a different color from that of the tire T. Alternatively, a detection algorithm may be provided to enable detection of the rim R and the wheel bolts B even if their color is the same as that of the tire T.

In the embodiment described above, a horizontal or obliquely downward image is captured in a direction orthogonal to the extending direction of the road. Alternatively, an image may be captured in any other direction. For example, the imaging device 10 may capture an oblique image in the direction of the coming vehicle.

In the embodiment described above, the target distance (the distance to the contour Ts of the side face) is calculated from the captured image. Alternatively, the target distance may be determined with a sensor separately disposed.

In the embodiment described above, the overload detecting system 1 is an integration of the imaging device 10 and the processor 20. Alternatively, an independent tire deformation calculator that detects overload from an image captured by an independent imaging device 10 may be provided.

In the embodiment described above, the deformation and the loading weight is stored in tables according to the types of tires and vehicles. Alternatively, for a case where tires of the same type are provided in a different number, the common table data may be weighted on the basis of data on the load ratio of tires, to convert the deformation to the loading weight.

The detailed configuration, processes, and steps of the embodiments described above may be appropriately modified without departing from the scope of the present invention.

Although embodiments of the present invention have been described and illustrated in detail, the disclosed embodiments are made for purposes of illustration and example only and not limitation. The scope of the present invention should be interpreted by terms of the appended claims.

The entire disclosure of Japanese patent application No. 2017-205045, filed on Oct. 24, 2017, is incorporated herein by reference in its entirety.

What is claimed is:

1. A tire deformation calculator comprising:
a memory, and
a processor which:
(i) detects a contour of a side face of a tire attached to a wheel of a vehicle in a captured image;
(ii) calculates load deformation of the contour of the side face, the load corresponding to a weight of the vehicle;
(iii) identifies a circular or polygonal shape or pattern on a plane parallel to the contour of the side face;
(iv) determines a conversion value for converting the identified shape or pattern in the captured image to a perfect circle or a regular polygon;
(v) calculates a predetermined value indicating the load deformation of the tire in the captured image based on the conversion value; and
(vi) calculates the load deformation based on the predetermined value.

2. The tire deformation calculator according to claim 1, wherein the processor identifies the shape or pattern in an inner area of the contour of the side face in the captured image.

3. The tire deformation calculator according to claim 2, wherein the processor identifies the shape or pattern disposed concentrically with the tire.

4. The tire deformation calculator according to claim 3, wherein the processor identifies a rim of the wheel as the shape or pattern.

5. The tire deformation calculator according to claim 3, wherein the processor identifies a plurality of bolts fixing the wheel as the shape or pattern.

6. The tire deformation calculator according claim 2, wherein the processor identifies the shape or pattern having a color different from a color of the contour of the side face of the tire.

7. The tire deformation calculator according to claim 1, wherein the processor determines a ratio of a length of a long axis of the shape or pattern to a length of a short axis of the shape or pattern to be a conversion value, and calculates the predetermined value from the ratio.

8. The tire deformation calculator according to claim 1, wherein the processor determines the conversion value corresponding to an angle between the contour of the side face and an imaging plane of the captured image.

9. The tire deformation calculator according to claim 1, wherein the processor determines the conversion value based on a target distance between the imaging plane of the captured image and the contour of the side face.

10. The tire deformation calculator according to claim 9, wherein the processor determines the target distance based on a distance between a predetermined reference position in the captured image and the contour of the side face.

11. The tire deformation calculator according to claim 1, wherein the processor calculates the load deformation based on a length in a vertical direction and a length in a horizontal direction of the contour of the side face.

12. The tire deformation calculator according to claim 1, wherein the processor determines lengths of line segments, each connecting two points on the contour of the side face via a center of a circle including an undeformed arc of the contour of the side face and calculates the load deformation based on the lengths of the line segments.

13. The tire deformation calculator according to claim 12, wherein the processor calculates the load deformation based on a difference between a maximum length and a minimum length of the line segments.

14. The tire deformation calculator according to claim 1, wherein the processor calculates the load deformation based on a contact length, the contact length being a length of the contour of the side face in contact with a road surface.

15. The tire deformation calculator according to claim 14, wherein the processor determines the contact length by determining an angular range in which a distance between a center of a circle including an undeformed arc of the contour of the side face and a point on the contour of the side face differs from a maximum value of the distance.

16. The tire deformation calculator according to claim 14, wherein the processor calculates the load deformation based on a ratio of a diameter of a circle including a undeformed arc of the contour of the side face and the contact length.

17. An overload detecting system comprising:
the tire deformation calculator according to claim 1;
an imaging device which captures an image of the wheel of the vehicle; and
a determiner which determines overload of the vehicle based on the load deformation of the tire determined by the tire deformation calculator for the wheel captured by the image capturing device.

18. The overload detecting system according to claim 17, wherein:
the determiner comprises a memory which stores a correspondence relationship between the load deformation and the loading weight of the vehicle, and
the determiner retrieves a loading weight of the vehicle corresponding to the load deformation from the memory.

19. A method for calculating load deformation of a tire corresponding to a weight of a vehicle in a captured image, the method comprising:
detecting a contour of a side face of a tire attached to a wheel of a vehicle in a captured image;
identifying a circular or polygonal shape or pattern in a plane parallel to the contour of the side face;
determining a conversion value for converting the shape or pattern in the captured image to a perfect circle or a regular polygon; and
calculating a predetermined value indicating the load deformation of the tire in the captured image based on the conversion value and calculating the load deformation based on the predetermined value.

* * * * *